United States Patent [19]

Mutschler, III et al.

[11] Patent Number: 5,974,430
[45] Date of Patent: Oct. 26, 1999

[54] METHOD FOR DYNAMICALLY EMBEDDING OBJECTS STORED IN A WEB SERVER WITHIN HTML FOR DISPLAY BY A WEB BROWSER

[75] Inventors: Eugene Otto Mutschler, III; Joseph Peter Stefaniak, both of San Clemente, Calif.

[73] Assignee: Unisys Corp., Bluebell, Pa.

[21] Appl. No.: 08/941,436

[22] Filed: Sep. 30, 1997

[51] Int. Cl.[6] .................................................. G06F 17/30
[52] U.S. Cl. .................................. 707/505; 707/2; 707/3; 707/4; 707/10; 707/100; 707/513
[58] Field of Search .................................. 707/3, 4, 500, 707/501, 505, 2, 9, 10, 100, 1, 513

[56] References Cited

U.S. PATENT DOCUMENTS

| | | | |
|---|---|---|---|
| 4,688,195 | 8/1987 | Thompson et al. | 706/11 |
| 5,499,366 | 3/1996 | Rosenberg et al. | 707/4 |
| 5,592,470 | 1/1997 | Rudrapanta et al. | 370/320 |
| 5,634,021 | 5/1997 | Rosenberg et al. | 345/353 |
| 5,649,186 | 7/1997 | Ferguson | 707/10 |
| 5,727,175 | 3/1998 | Malone et al. | 345/356 |
| 5,734,887 | 3/1998 | Kingberg et al. | 707/4 |
| 5,764,230 | 6/1998 | Baradel et al. | 345/346 |
| 5,799,157 | 8/1998 | Escallon | 707/104 |
| 5,815,149 | 9/1998 | Mutschler, III et al. | 345/335 |
| 5,821,523 | 10/1998 | Bunte et al. | 235/472 |
| 5,870,549 | 2/1999 | Bobo, II | 509/200 |
| 5,905,984 | 5/1999 | Thorsen | 707/9 |

*Primary Examiner*—Wayne Amsbury
*Assistant Examiner*—Shahid Alam
*Attorney, Agent, or Firm*—J. Ronald Richebourg; Mark T. Starr; Steven B. Samuels

[57] ABSTRACT

A method in a computing system having at least one server and a multiplicity of clients coupled thereto by means of a network. The server executes a Web Server program and at least one of the clients executes a Web browser program. The method operates in the server and at least one of the clients for supporting dynamic access to objects stored in the server repository by the Web browser program. The method begins in the client by parsing Form description language to obtain references to objects stored in the server repository. For each reference to an object stored in the repository, a message is constructed for the Repository Object for transmission to the Web server. Within the Web server the message is used to retrieve the contents of the Repository Object from the server repository. Next, the retrieved contents of the Repository Object is returned to the client for association with its Data Name. Next, a GUI Control is located that is associated with the Data Name; and, the contents of the Repository Object are placed into the GUI Control located in the previous step. Accordingly, a Form is displayed with GUI Controls filled in with values from the server repository.

17 Claims, 18 Drawing Sheets

WELCOME TO TRIPS

EMPLOYEE SSN : _____ 20

LAST NAME : _____ 24

APPROVER PASSWORD: _____

'X' TO SELECT -OR- '?' FOR HELP

☐ INQUIRE ON TER                    ☐ INQUIRE ON FAR/FTR RATES

☐ CREATE A TER                      ☐ INQUIRE ON STATEMENT (MMYY)

☐ CREATE A TRAVEL AUTH./ADVANCE     ☐ COMPLETE, CORRECT OR DELETE A TER

☐ APPROVE TRAVEL ACTIVITY           ☐ APPROVER ADMIN FUNCTIONS

☐ EXIT TRIPS                        ☐ TRIPS NEWS UPDATED12/09/96

☐ TRIPS COMMENTS

THE NEXT DIRECT DEPOSIT WILL BE FRIDAY, DECEMBER 13, 1996
THE NEXT DIRECT AMEX CREDIT CARD PAYMENT WILL BE DECEMBER 23, 1996

[ TRANSMIT ] 28

*FIG. 3*

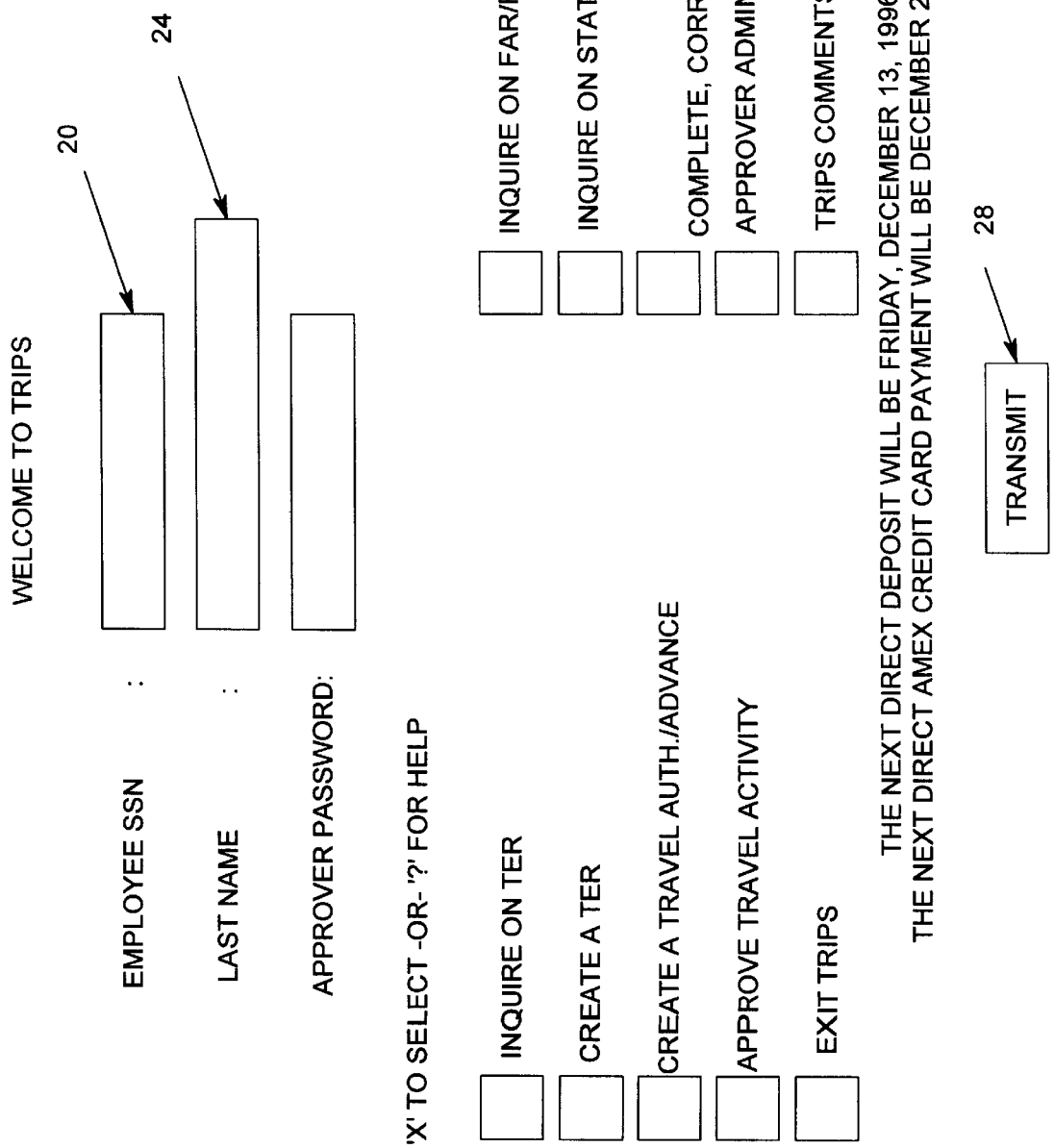

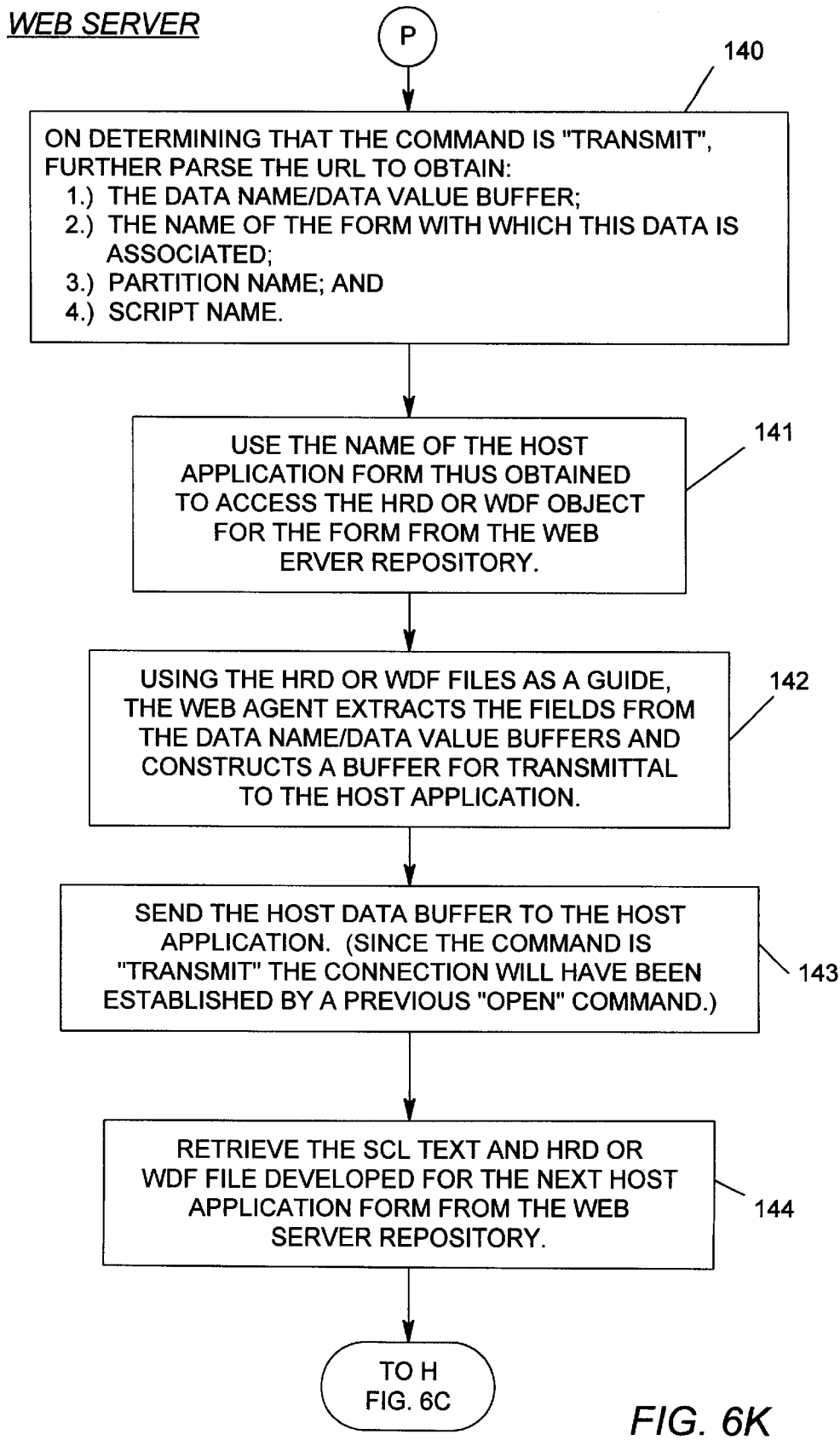

METHOD FOR DYNAMICALLY EMBEDDING OBJECTS STORED IN A WEB SERVER WITHIN HTML FOR DISPLAY BY A WEB BROWSER

CROSS REFERENCE TO RELATED PATENT APPLICATIONS

This application relates to the following co-pending applications, assigned to the same assignee hereof, which are incorporated herein by reference.

U.S. Ser. No. 08/941,437, entitled METHOD FOR EXTENDING THE HYPERTEXT MARKUP LANGUAGE (HTMC) TO SUPPORT ENTERPRISE APPLICATION DATA BINDING, now pending by the same inventors hereof.

U.S. Ser. No. 08/941,438, entitled METHOD FOR EXTENDING THE HYPERTEXT MARKUP LANGUAGE (HTML) TO SUPPORT GRAPHICAL USER INTERFACE CONTROL PRESENTATION now pending, by the same inventors hereof.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to client/server computing in a World Wide Web ("Web") environment, and more particularly to a method for supporting dynamic object access to a Web browser.

BACKGROUND OF THE INVENTION

With the rising popularity of client/server computing and the Web, businesses are looking for even better ways to increase their competitive advantage. Information is one of business's most precious commodities. Accordingly, there is a need for flexibility to position information in ways that better supports business organizations and their customers.

Client/server technology offers graphical user interfaces (GUI's) a choice of open systems, rapid application development, increased end-user productivity and much more. By combining this technology with the Internet and intranets, a powerful system is made available to distribute information throughout the business and customer communities. The Web is a purely client/server environment that can bring business to customers. Even if a business has information that needs to be kept within the organization, the Web technology is still available as an intranet, which is a web site behind a firewall and made available only to employees of the organization. The term "firewall" as used herein means a combination of hardware and software that prevents access to secured data over an Internet or Intranet. The idea is to protect a cluster of more loosely administered machines hidden behind the firewall from crackers or hackers.

There is also a need to make the move to client/server and Internet technologies without having to migrate from existing host applications. The best way to build new client/server applications that can be integrated with current applications is to combine the dependability of enterprise-wide systems with the flexibility of distributed processing.

Early attempts at capitalizing on the advantages of the client/server applications involved the use of the PC as a "dumb terminal", or a character-based network terminal, that interacted directly with legacy programs operating on a mainframe or host computer. This approach was unsatisfactory because the user was limited to a character-mode display. Later attempts included such solutions as the Designer Workbench (which is a software tool now referred to as PowerClient and available from Unisys Corporation, assignee of this patent ). The PowerClient product gives the user the ability to capture Forms descriptions that are on the mainframe, and to convert character-based fields into Windows-based visual elements such as edit fields, buttons, etc. A language called SCL (Screen Control Language) was created for describing the visual elements as well as indicating processing that will be performed on the client PC's.

With reference to various types of legacy programs operating on the host, LINC (i.e., "Logical Information Network Compiler") can generate Screen Control Language ("SCL") directly. SCL is created with the use of the PowerClient for third generation languages (3GL) such as COBOL or ALGOL legacy programs; and, in the case of MAPPER, which is a third system and language for legacy programs, there is no automatic way to generate SCL. For MAPPER, the user must use a Forms design tool (such as the Development Studio product) for drawing visual elements to generate the required SCL that matches the MAPPER application.

More recently, it was possible to take SCL definitions of a Form and turn them into a Visual Basic or a PowerBuilder executable program. For an amplification of this method reference is made to a co-pending patent application entitled A METHOD FOR GENERATING CODE FOR MODIFYING EXISTING EVENT ROUTINES FOR CONTROLS ON A FORM, U.S. Ser. No. 08/803,137, filed Feb. 19, 1997 by the same inventors hereof and assigned to the same assignee hereof. PowerBuilder is a product of PowerSoft Company (which has recently merged with Sybase, Inc. of Emeryville, Calif., and Visual Basic is a product of Microsoft Corporation of Redmond, Wash. However, since the Visual Basic and PowerBuilder client builders generate executables, there is no way to incorporate the presentation functionality they provide into a Web browser, which is a client-side software module for accessing a Web server. Moreover, there is no obvious way to combine client/server computing on the Web with GUI elements.

SUMMARY OF THE INVENTION

It is therefore an object of the method of the present invention to provide an evolutionary approach to client/server technology so that a user can retain their existing information technology investment in legacy programs, yet move to client/server computing on the Web. A user can increase productivity and reduce training costs because using the method of the present invention does not require any changes to the legacy programs.

A feature of the method of the present invention is that it is now possible to dynamically embed SCL Text within the HyperText Markup Language (HTML) for legacy Forms.

Another feature of the method of this invention is that any references to legacy Application objects included in the SCL Text are interpreted when the HTML Form is displayed and the objects referred to are retrieved from the repository and displayed in their proper place on the Form.

An advantage of the method of the present invention is the capability of displaying objects in the context of a Web browser, which objects are retrievable from a repository and can be dynamically updated, as opposed to static files.

In response to a user selecting a specific URL, a request is made to the legacy application to retrieve the specified Form; and, the SCL Text that was previously generated and that represents the presentation information for the Form is retrieved from the storage device (i.e., a repository). The data from the legacy Form is parsed and assigned Data Names that were previously assigned to the associated application Form.

An HTML Form is thus generated dynamically, which contains a reference to the process of the present invention. Included in this reference are both the SCL Text and the list of Data Names. This information is interpreted by this process to display the legacy Form in the context of a Web browser.

The HTML Form is interpreted by the Web browser with the exception of the embedded presentation data, which is interpreted by the SCL Control. The HTML Form, by reference, invokes the SCL Control, which is thus responsible for parsing the embedded SCL. For each GUI object referenced in the SCL, the SCL Control will display a corresponding object within the Web browser's client area having defined offsets.

The SCL Control thus invokes the method of this invention, which further parses the SCL to locate those GUI objects whose contents are to be retrieved from the repository upon display of the form. The method then constructs a message for each such control that contains information necessary to locate the contents in the repository and sends it to the server. The server retrieves the control contents from the repository and returns it to the SCL Control. The SCL Control, while continuing to execute the method of this invention, places the returned contents into the GUI Control.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

BRIEF DESCRIPTION OF THE DRAWINGS:

FIG. 3 is a print of a computer screen display of the same Form for TRIPS after adding visual controls using the Development Studio.

FIG. 4 is a print of a computer screen display after employment of the method of the present invention.

FIGS. 6A through 6K (intentionally omitting "6I") illustrate a run-time process that includes the steps performed by the method of the present invention.

DETAILED DESCRIPTION OF ONE EMBODIMENT

Figure 1:
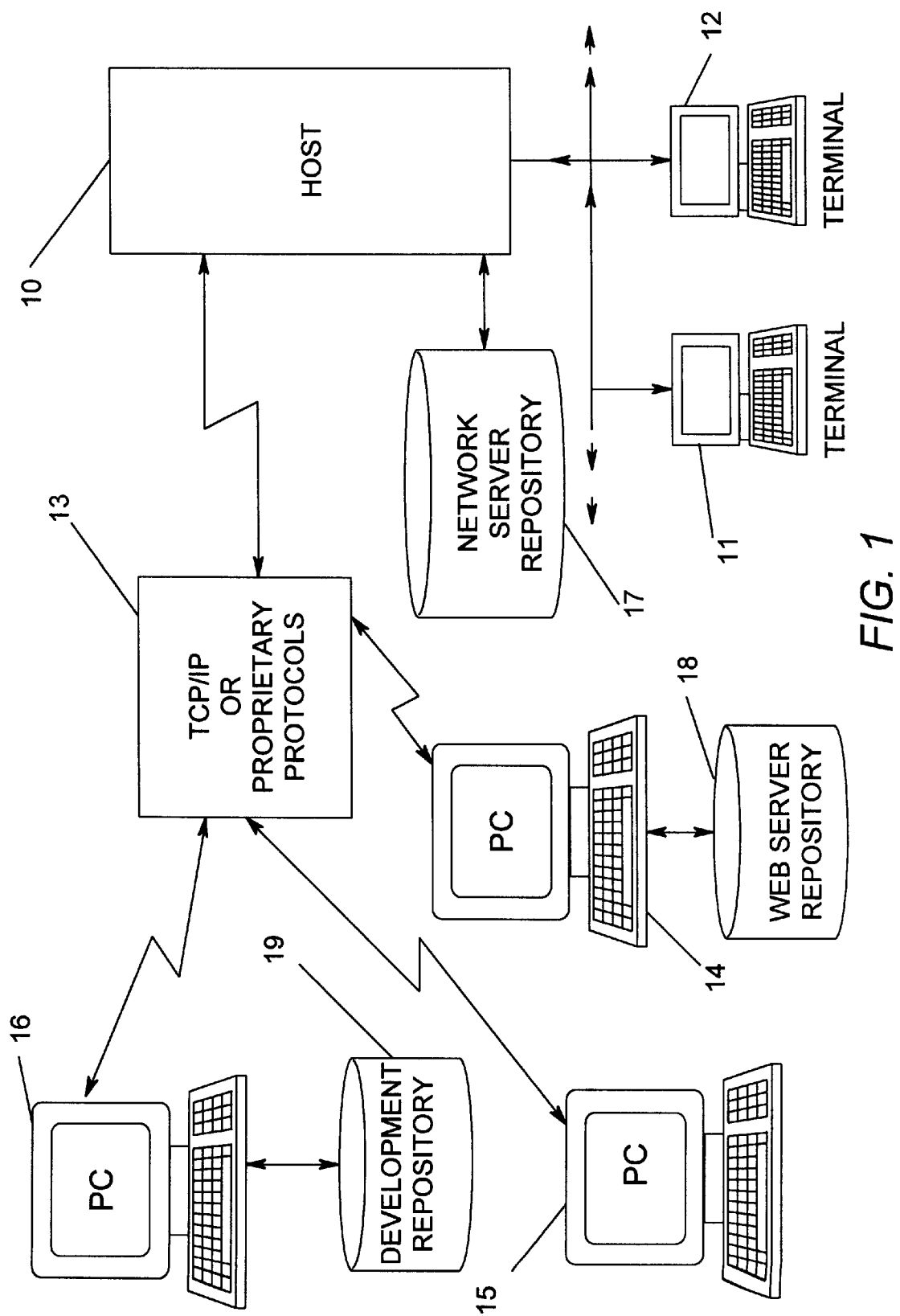
FIG. 1 is a block diagram of a system that could be used to develop files and to execute the same employing the steps of the method of the present invention.

The method of the present invention integrates the popular Web browsers with legacy applications in order to provide Form presentation capabilities not supported using HTML, which is today's most popular Web language. This means that one can create a unified GUI front-end "look and feel" for even the most complex applications. The disclosed method is ideal for building and interfacing powerful desktop client applications with 3GL and LINC legacy applications.

One embodiment of the method of the present invention, which is referred to as the SCL Web Control (or "SWC"), enables the Web browser user to view existing legacy application Forms as designed using the Development Studio. The SWC is an ActiveX compliant control used to communicate with either a Netscape or Microsoft Web browser. ActiveX is a software technology sponsored by Microsoft Corporation. In the case (of Netscape, the control is embedded in a Netscape plug-in. The SWC interprets the SCL scripting language, and is loaded by the Web browsers when referenced by an HTML page. The SWC interprets the SCL embedded within the HTML page and paints the Form as exactly drawn in the Development Studio.

At this juncture of the description several definitions are added to assist in the understanding of the present invention.

Application shall mean a program written by, a user which accomplishes some operation.

Command shall mean an instruction to perform an operation. In the Web Agent (defined hereafter) context, the Command operation is to obtain ("Open") a host Form or to send the results of an entry of data into the Form back to the application ("Transmit").

Data Name shall mean the name of a host application datum. That is, is the identification given to a field on a host screen.

Data Value shall mean the value of a host application datum. That is, the value associated with a field on a host screen.

Form shall mean the visual display elements of an application containing fields for entry and display of the application.

GUI Control shall mean a visual element of a GUI display, such as an edit box or a list box. Other examples include buttons, list boxes, check boxes and combo boxes.

Host Reply Definition (HRD) shall mean a file used in the PowerClient 3GL environment that maps characters in the data stream from the host with the fields and their Data Names in the modernized Form.

Partition or Partition Name shall mean a space in a repository, thereby providing a means for categorizing data in the repository. In particular, it shall mean a name given to represent a series of Forms associated with a 3GL/LINC (i.e., Legacy) application.

Repository Object shall mean such things as SCL Text (defined hereafter), list box data, an image, etc.

SCL Construct shall mean a valid production of the SCL language's grammar, i.e., an SCL Text (defined hereafter) statement.

SCL Control shall mean an SCL Construct that describes a particular GUI Control, such as an edit field, list box, etc.

SCL Web Control shall mean an ActiveX based control used in a PowerClient run-time environment.

SCL Text shall mean a collection of SCL Constructs. SCL is a Unisys proprietary language. SCL Text is used to describe GUI Controls to be rendered within a browser.

SCL Files shall mean those files that contains SCL Text, which are referred to as an object in a repository.

Script shall mean a sequence of instructions used to establish connectivity with a host computer and a specific application of the host.

UniForm Resource Locator (URL) shall mean an identifier for locating a resource on the Web.

Web Agent shall mean the PowerClient module that interprets special URL requests passed to it by the Web Server (defined hereafter). It uses information in the special URL to obtain data from the host for a particular Form and returns it to the Web Control via the Web Server and Web browser. It is also a series of both client/server components that permit LINC/3GL applications to have access over the Web.

Workstation Driver File (WDF) shall mean a file used in the PowerClient LINC environment that maps characters in the data stream from the host with the fields and their Data Names in the LINC Form.

Referring now to FIG. 1, a client/server system configuration is illustrated wherein a host or mainframe 10 has terminals 11 and 12 coupled thereto and network connection 13 coupling to clients 14, 15 and 16. The network connection 13 may typically comprise a TCP/IP or any other proprietary protocol. The host 10 could be any computing system capable of operating in a client/server environment, such as for example any Unisys or IBM computer. The host 10 is coupled to a network server repository 17, the client 14 (also referred to herein as an NT Web Server) is connected to a client repository 18; and, the client 16, which in the illustrated embodiment is used for development, is coupled to a development repository 19. The clients 14, 15 and 16 could typically be any currently available PC capable of executing the Windows 95 or NT operating system. However, it is required that the client 14 be able to execute the Windows NT operating system.

The host 10 is capable of executing software programs including LINC and 3GL legacy programs. The client 14 is capable of executing software programs including InfoConnect (transports), PowerClient and Web Agents. The client 15 is capable of executing software programs such as SCL Web Control and Web browsers. The client 16 is capable of executing software programs such as PowerClient and Info-Connect. In addition to those programs alluded to hereinabove, the client 16 is capable of executing many of the more popular and widely-used programs such as PowerBuilder and Visual Basic.

The Web Server repository 18 stores Forms that are distributed to clients using Web browsers. The repository 18 is the database that contains LINC Form objects, image objects, Script files and data files that are downloadable from the host system, as required.

The network server repository 17 holds host application Forms, and it provides version control for Development Studio Forms.

The Development Repository 19 is used as a database for the development process and in particular stores LINC Form objects, image objects, data files and scripts. Moreover, the development repository 19 contains the objects and scripts necessary to develop and properly display Forms in the Web browser. As one begins modernizing their applications, developers can take advantage of the repository 19 to share tasks. When a new Form is stored in this repository, it is immediately available to other development environment users.

The InfoConnect program includes three parts of a suite that runs with PowerClient, and they are the Unisys MT Emulator, the UTE Emulator and the IBM 3270, all of which are available from DCA, Inc., of Cincinnati, Ohio. PowerClient is a program available from Unisys Corporation of Blue Bell, Pa., assignee of the present invention. PowerClient includes 10 components: Code Generation Assistants (two), 3GL Work Bench, LINC Work Bench, MAPPER, Development Studio, Repositories on the Mainframe (two), CBT and Web Agent.

Figure 2:
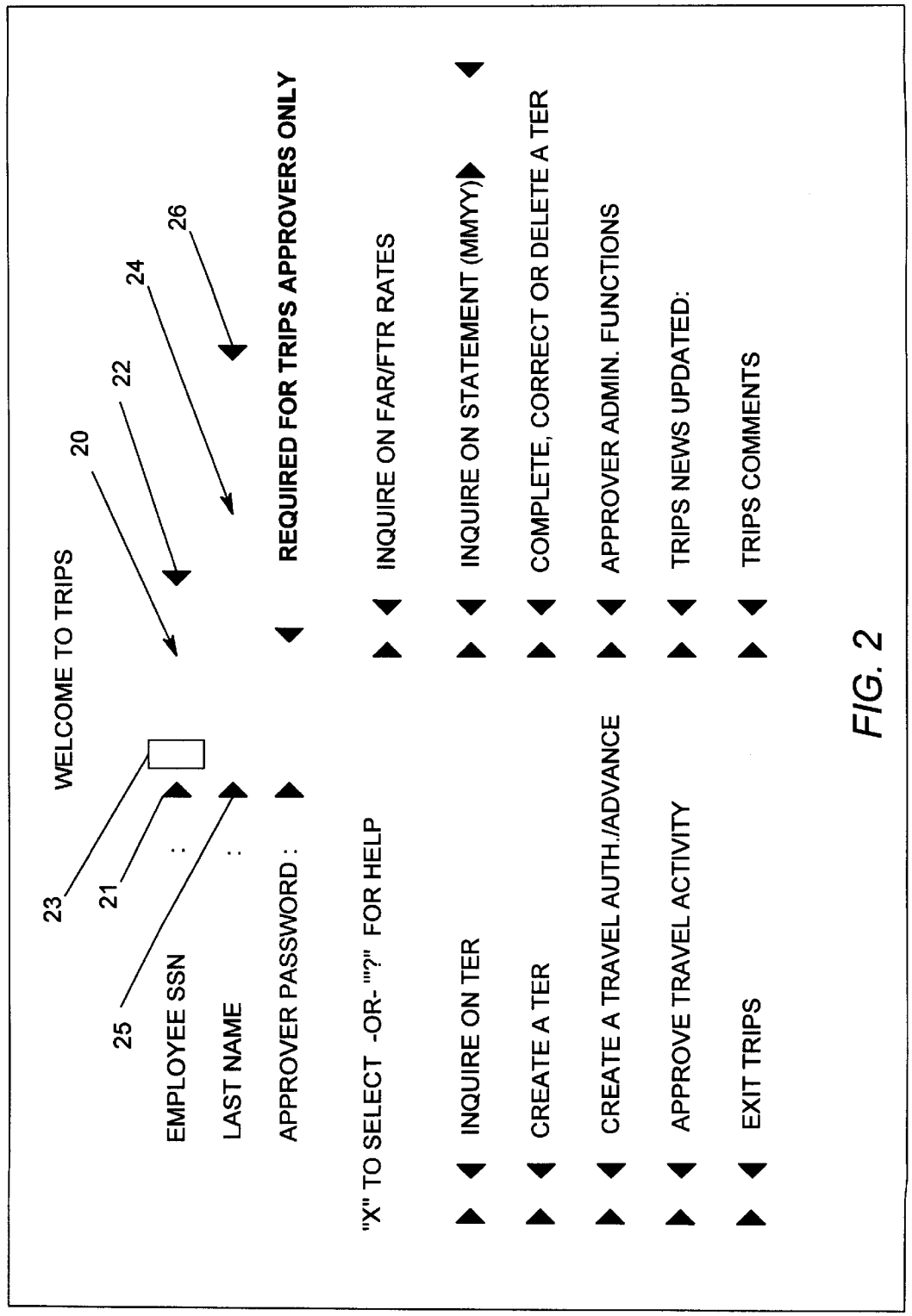
FIG. 2 is a print of a computer screen display from a 3GL legacy application Form for TRIPS, a report for tracking employee expenses, which is convertible by using the method of the present invention.

Referring now to FIG. 2, a print of a screen display of a Form for a 3GL legacy application is illustrated. When a client user calls up the INFOconnect and logs onto the server and specifies TRAVEL, this particular Form entitled TRIPS appears on the screen. It is a typical Form to be completed by an employee of an organization for reimbursement of travel expenses. Each field of this Form is depicted by a space between opposing arrowheads. For example, the field entitled EMPLOYEE SSN is that space 20 between opposing arrowheads 21 and 22, and includes a display screen cursor 23. The next field LAST NAME is that space 24 between opposing arrowheads. and 26. The remaining fields of the Form are similarly depicted. There are a total of fifteen (15) fields on this Form.

Preparatory to modifying the TRIPS Form using the method of this invention, the user captures this Form using the combined facilities of the INFOconnect Emulator and the PowerClient Development Studio (PDS). The user then creates Data Names for each field of the Form. SCL syntax will contain each of the Data Names created. For example, for the Form shown in FIG. 2, the following information will be created and stored in the development repository 19, and is to be used in the SCL generation process. The user would indicate the data entry fields and the static text in the Form.

| SCL | SCL OFFSETS | | |
|---|---|---|---|
| DATANAMES | Row | Column | Length |
| EMPSSN | 3 | 19 | 20 |
| LASTNAME | 4 | 19 | 25 |
| CREATOR | 5 | 19 | 10 |
| . | | | |
| . | | | |
| . | | | |

The user/creator has a great deal of flexibility and can create a push button or a window for a specific field, can change names or use previous text, etc. The output is stored in the development repository 19.

Referring now to FIG. 3, a print illustrates a computer screen display of a modernized version of the 3GL Form shown in FIG. 2 and described hereinabove. Notice that this modernized Form includes windows for entering data, wherein window 20 corresponds to the space 20 in FIG. 2 for entry of an Employee SSN. Window 24 corresponds to the space 24 in FIG. 2. A TRANSMIT button 28 is added by the modernizing process.

Referring now to FIG. 4, the modernized Form shown in FIG. 3 is now embedded within a Web browser display, having been stored in the repository 18 and retrieved by a Web browser at client 15 using the method of this invention. Corresponding reference numbers identify like components.

Figure 5A:
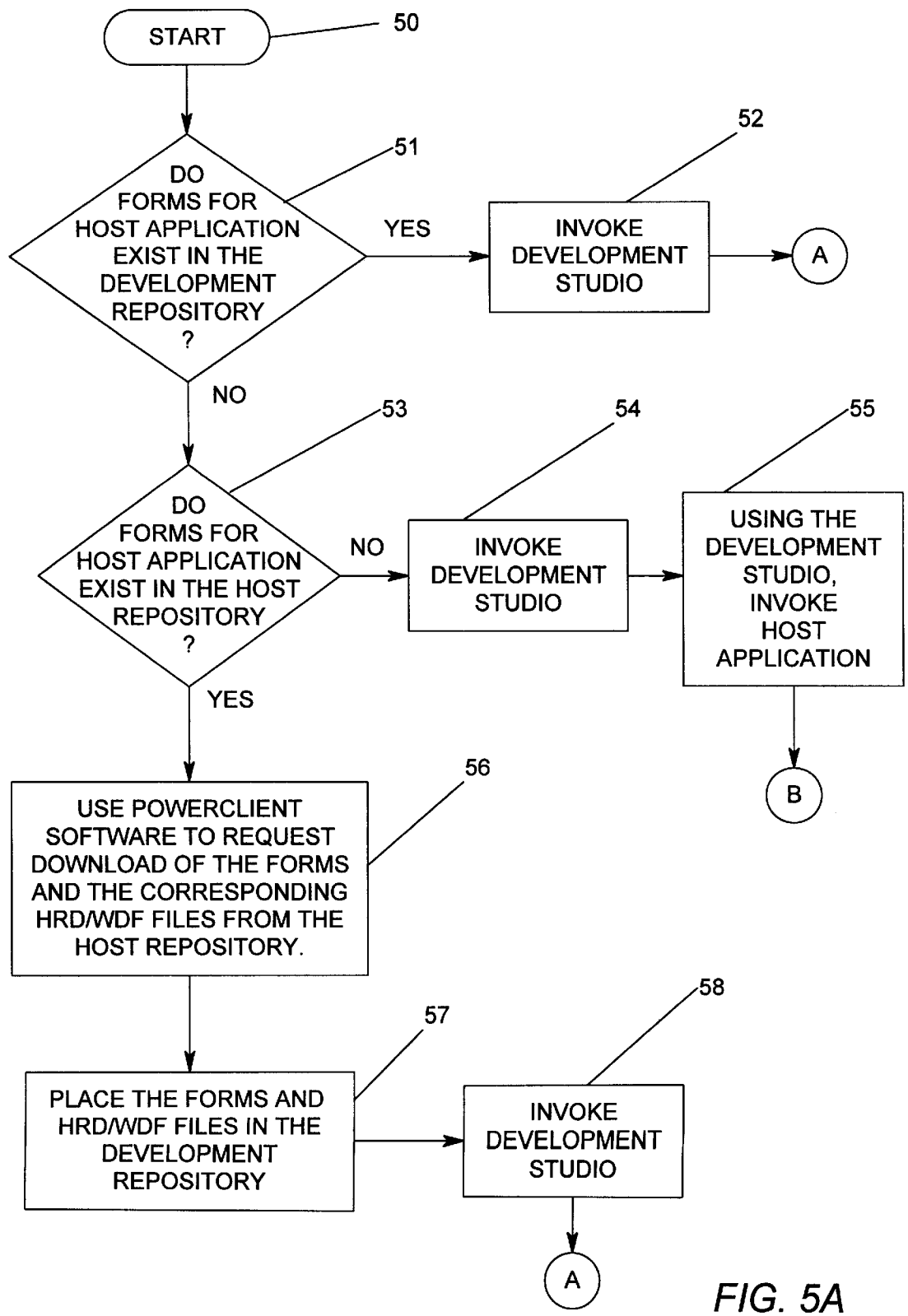
FIGS. 5A through 5C combined Form a flow chart illustrating the process for development of files for use with the method of the present invention.

Referring now to FIG. 5A, which is the first of a three-sheet drawing showing a flow chart of the process for development of files for use with the method of the present invention. The process begins in the client 16 with a start bubble 50 followed by an inquiry as to whether or not Forms for the host application exist in the development repository 19 (diamond 51). If the answer to this inquiry is yes, then the Development Studio is invoked (block 52). On the other hand, if the Forms do not exist in the development repository, another inquiry is made as to whether or not Forms for the host application exist in the host repository 17 (diamond 53). If the Forms do not exist on the host, then the Development Studio is invoked (block 54) and with the use of the Development Studio, the host application is invoked (block 55).

If the host application Form does exist in the host repository 17 (yes leg of the diamond 53), then the PowerClient software is used to request a download of the Forms and the corresponding HRD/WDF files from the host repository 17 (block 56). Next, the Forms and the HRD/WDF files are placed in the development repository 19 (block 57). After this, the Development Studio is invoked (block 58). Upon completion of the step 52 or the step 58 a branch is made to a later point in the process at a connector A, which will be described shortly. Upon completion of the step 55 a branch is taken to FIG. 5B at a connector B.

Figure 5B:
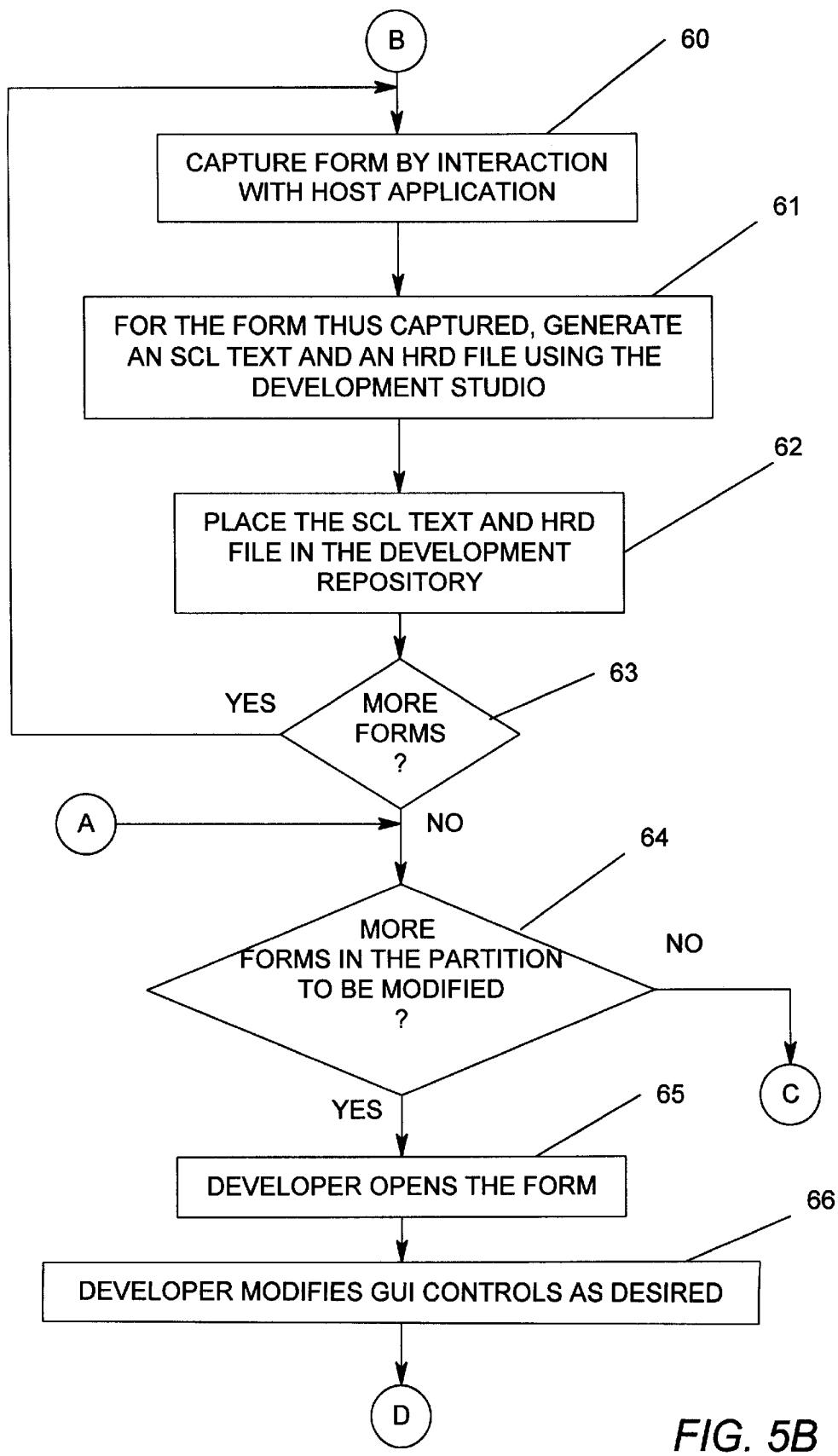

Referring now to FIG. 5B at the connector B, the next step in the development process is to capture a Form by interaction with the host application (block 60). For the Form thus captured, an SCL Text and an HRD file are generated using the Development Studio (block 61). Following this, the SCL Text and the HRD file are placed in the development repository 19 (block 62). An inquiry is then made as to whether or not there are more Forms (diamond 63). If the answer is yes, then a return is made back to the process block 60. This cycle repeats itself until all Forms have been processed, and an exit is taken on the no leg of the diamond 63.

The process of updating and modifying of the Forms begins when an inquiry is made as to whether or not there are more Forms in the Partition to be modified (diamond 64). Note that the connector A from the preceding FIG. 5A is also an input to the diamond 64. If the answer to the diamond 64 inquiry is yes, then the developer or user opens the Form by using the Development Studio (block 65). On the other hand, if there are no more Forms in the Partition to be modified, then a branch is made to a later point in the process as illustrated by a connector C. Next, the developer modifies the GUI Controls as desired (block 66). Following this, the process illustration continues on the next sheet of the drawings, FIG. 5C in particular, as illustrated by a connector D.

Figure 5C:
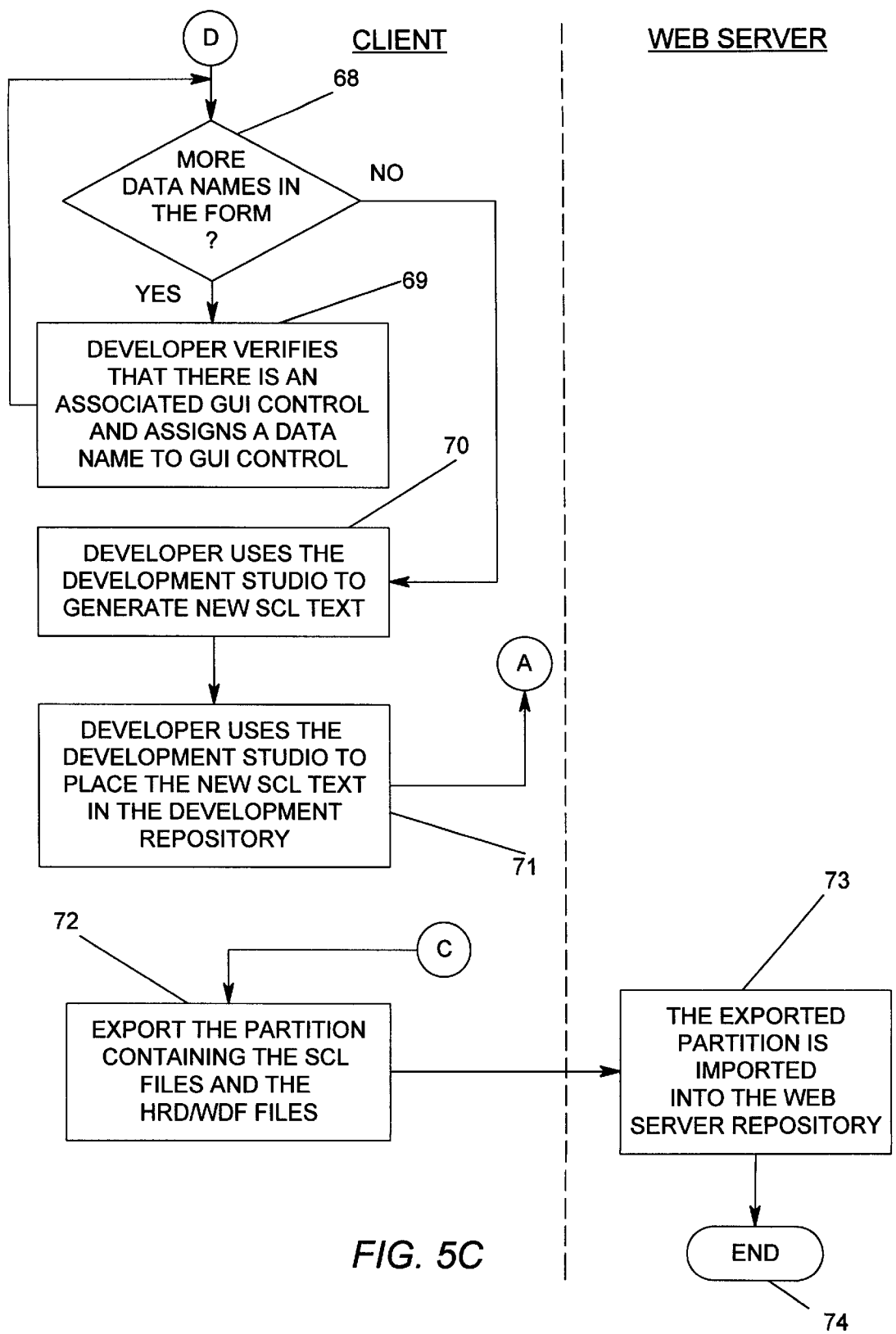

Referring now to FIG. 5C at the connector D, an inquiry is made as to whether or not there are more Data Names in the Form (diamond 68). If the answer to this inquiry is yes, then the developer verifies that there is an associated GUI Control and assigns a Data Name to the GUI Control (block 69). Once all of the Data Names in the process have been verified, then an exit is taken from the no leg of the diamond 68 to another step in which the developer uses the Development Studio to generate a new SCL Text (block 70). Following this, the developer uses the Development Studio to place the new SCL Text in the development repository 19 (block 71). On completion of this step, a return is made back to that part of the process illustrated in FIG. 5B at the connector A, and in particular to the inquiry in the diamond 64. Once all of the Forms in the Partition have been modified, then an exit is taken from the no leg of the diamond 64 at the connector C and continues in FIG. 5C, whereupon the Partition containing the SCL Files and the HRD/WDF files is exported from the Development Repository 19 (block 72). The exported Partition is imported into the Web Server repository 18 (block 73), and the process ends (bubble 74).

At this juncture the SCL Text for the Forms in the last application have been developed in accordance with the directions of the developer/user.

Figure 6A:
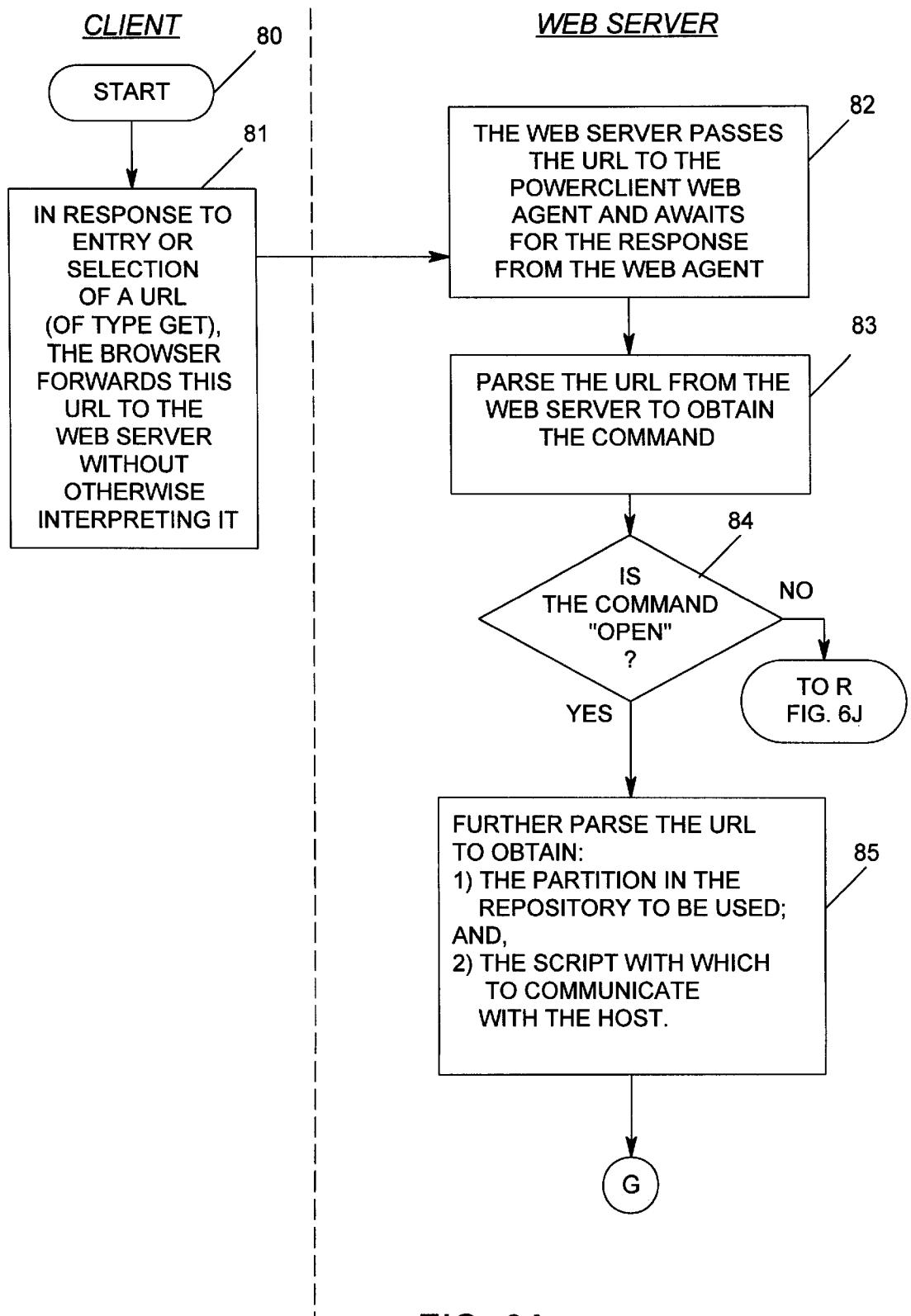

Referring now to FIG. 6A, the first of a ten-sheet drawing is shown that illustrates the run-time process, which includes the steps of the present invention. The process begins in the client 15 with a start bubble 80 followed by a process step performed in response to entry or selection of an URL that contains certain elements, among which are an open Command, a Form name, a Script name and a Partition name. A Web browser forwards the URL to the Web server 14 without otherwise interpreting it (block 81). Next, within the Web Server 14, the URL is passed to the Web Agent (to which it is addressed) and awaits for a response from the Web Agent (block 82).

The Web Agent then parses the ULR from the Web Server 14 to obtain the Command which is embedded within it (block 83). Next, an inquiry is made as to whether or not the Command is "Open" (diamond 84). If the answer to this inquiry is no, then a branch is taken to a later point in the process as depicted by a connector R. On the other hand, if the answer to this inquiry is yes, then the Web Agent further parses the URL (block 85) to obtain the following:

1.) the Partition in the repository 18 to be used; and,

2.) the Script for communicating with the host.

Figure 6B:
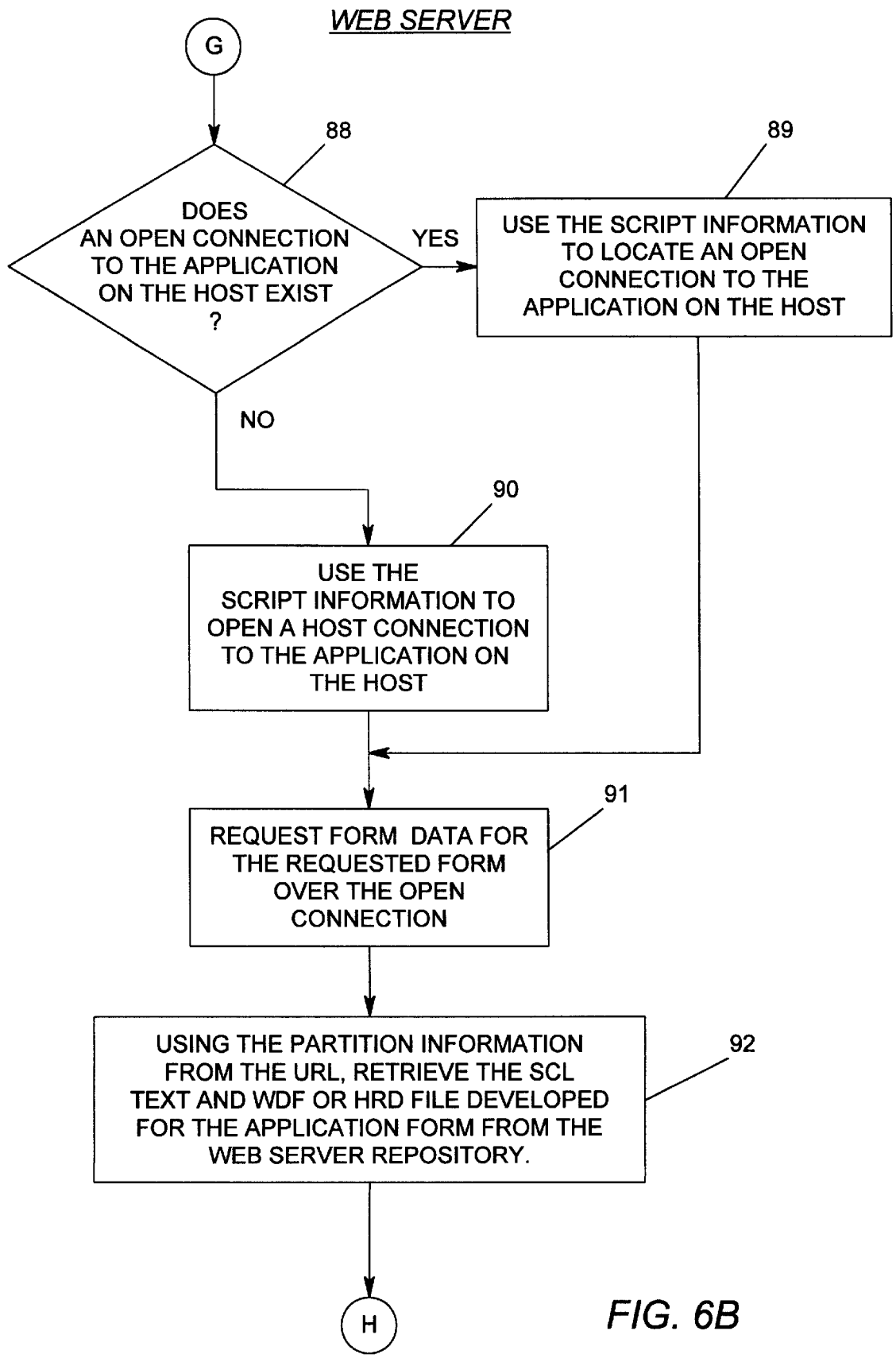

The process illustration continues in FIG. 6B at a connector G.

Referring now to FIG. 6B at the connector G, an inquiry is made as to whether or not an open connection to the application on the host 10 exists (diamond 88). If the answer to this inquiry is yes, then the Web Agent uses the Script information to locate an open connection to the application on the host 10 (block 89). On the other hand, if the answer to this inquiry is no, then the Web Agent uses the Script information to open a connection to the host 10 (block 90). After completion of either the step 89 or 90, the Web Agent requests Form data for the requested Form over the open connection (block 91). After this, and using the Partition information from the URL, the Web Agent retrieves the SCL Text and the WDF or HRD file developed for the application Form from its repository 18 (block 92). The process illustration continues on the next sheet of the drawings as denoted by a connector H.

Figure 6C:
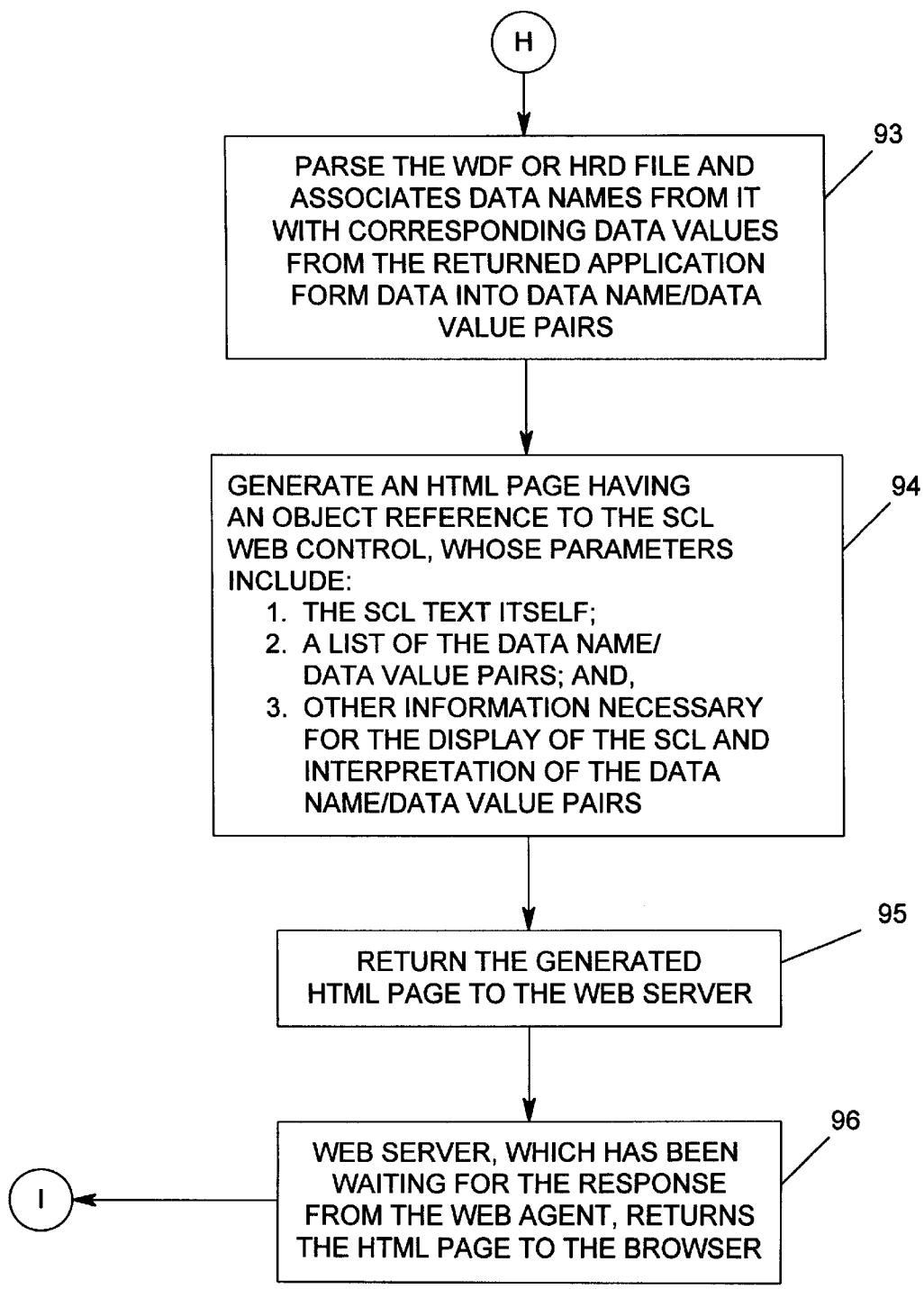

Referring now to FIG. 6C at the connector H, the Web Agent parses the WDF or HRD file and associates Data Names from it with corresponding Data Values From the returned application Form data into Data Name/Data Value pairs (block 93). Next, the Web Agent generates an HTML page having an object reference to the SCL Web Control, whose parameters include:

1.) The SCL Text itself;

2.) A list of the Data Name/Data Value pairs; and,

3.) Other information necessary for the display of the SCL and interpretation of the Data Name/Data Value pairs (block 94).

The Web Agent then returns the generated HTML page to the Web server (block 95). Following this, the Web server, which has been waiting for the response from the Web Agent, returns the HTML page to the Web browser (block 96). The process illustration continues in the next sheet of the drawings within the PC 15, as denoted by a connector I.

Figure 6D:
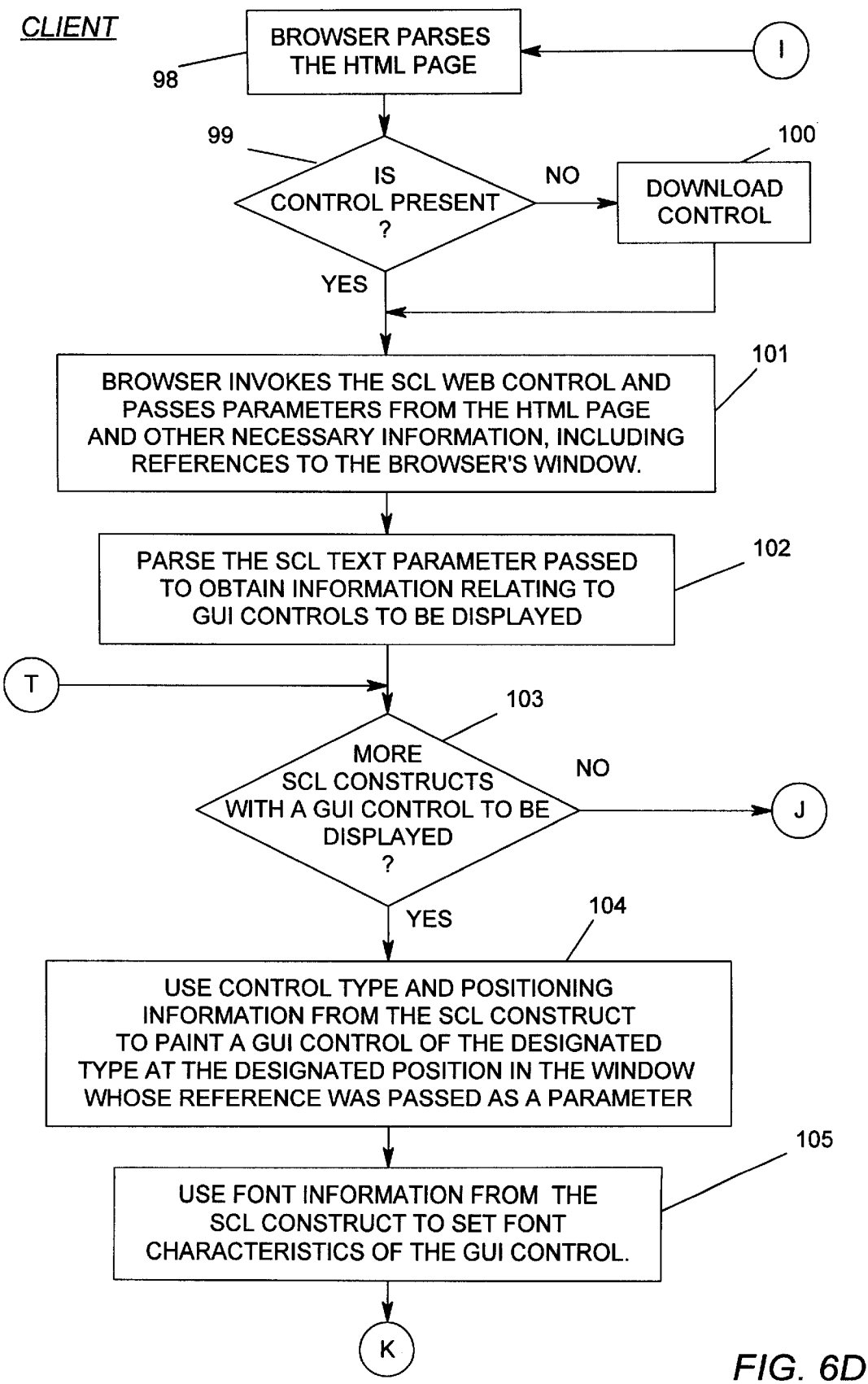

Referring now to FIG. 6D at the connector I, the Web browser parses the HTML page (block 98). Upon encountering the object reference to the SCL Web Control, an inquiry is made as to whether or not the SCL Web Control is present (diamond 99). If the answer is no, then SCL Web Control is downloaded (block 100). Once the SCL Web Control is present, the browser invokes the SCL Web Control and passes to it the parameters from the HTML page and other necessary information, including references to the Web browser's window (block 101). Following this, the SCL Web Control parses the SCL Text parameter passed to it to obtain information relating to the GUI Controls to be displayed (block 102).

An inquiry is next made as to whether or not there are more SCL Constructs with a GUI Control ted be displayed (diamond 103). If the answer to this inquiry is no, then a branch is made to a later part of the process, which will be described later, as designated by a connector J. On the other hand, if the answer to this inquiry is yes, then the SCL Web Control uses the control type and positioning information from the SCL Construct to paint a GUI Control of the designated type at the designated position in the window whose reference was passed to it as a parameter (block 104). Next, the SCL Web Control uses font information from the SCL Construct to set font characteristics of the GUI Control (block 105). The process illustration continues in the next sheet of the drawings as denoted by a connector K.

Figure 6E:
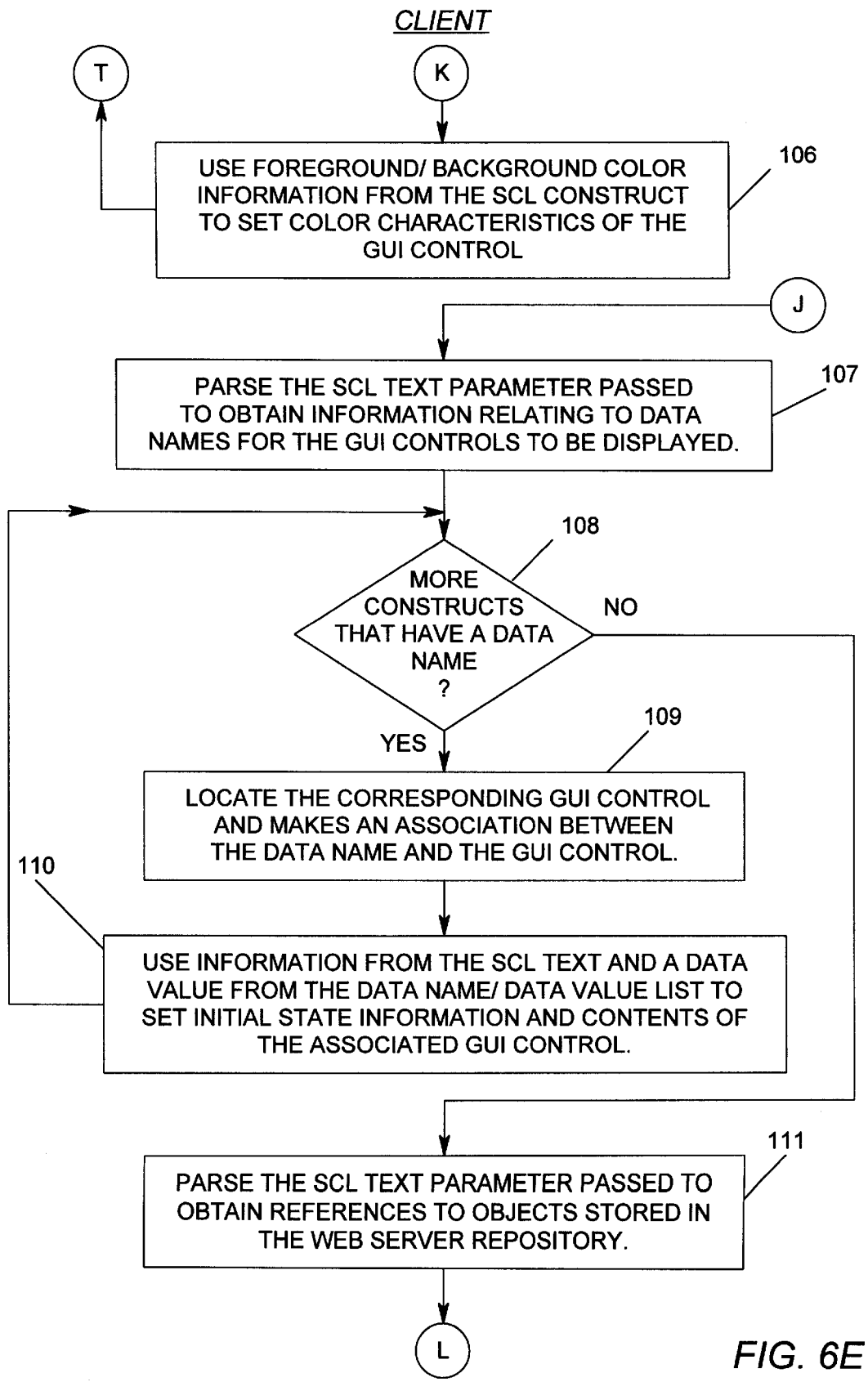

Referring now to FIG. 6E at the connector K, the SCL Web Control uses foreground/background color information from the SCL Construct to set color characteristics of the GUI Control (block 106). Following this step, a return is made back to the diamond 103 (via a connector T to FIG. 6D) for processing the next SCL Construct. Once all of the SCL Constructs have been processed, a branch is taken via the connector J to a process step wherein the SCL Web Control parses the SCL Text parameter passed to it to obtain information relating to Data Names for the GUI Controls to be displayed (block 107). Following this, an inquiry is made as to whether or not there are more constructs that have a Data Name (diamond 108). If the answer to this inquiry is yes, then the SCL Web Control locates the corresponding GUI Control and makes an association between the Data Name and the GUI Control (block 109).

The SCL Web Control then uses information from the SCL Text and a Data Value from the Data Name/Data Value list to set initial state information and contents of the associated GUI Control (block 110). Next a return is made back to the diamond 108 for processing the next construct. It is pointed out at this juncture of the detailed description that the steps of the method of this invention begin with the step depicted by block 111 and end with the step depicted by a block 123. Once all of the constructs have been processed, a branch is taken to a process step wherein the SCL Web Control parses the SCL Text parameter passed to it to obtain references to objects stored in the Web Agent repository 18 (block 111). The process illustration continues on the next sheet of the drawings as denoted by a connector L.

Figure 6F:
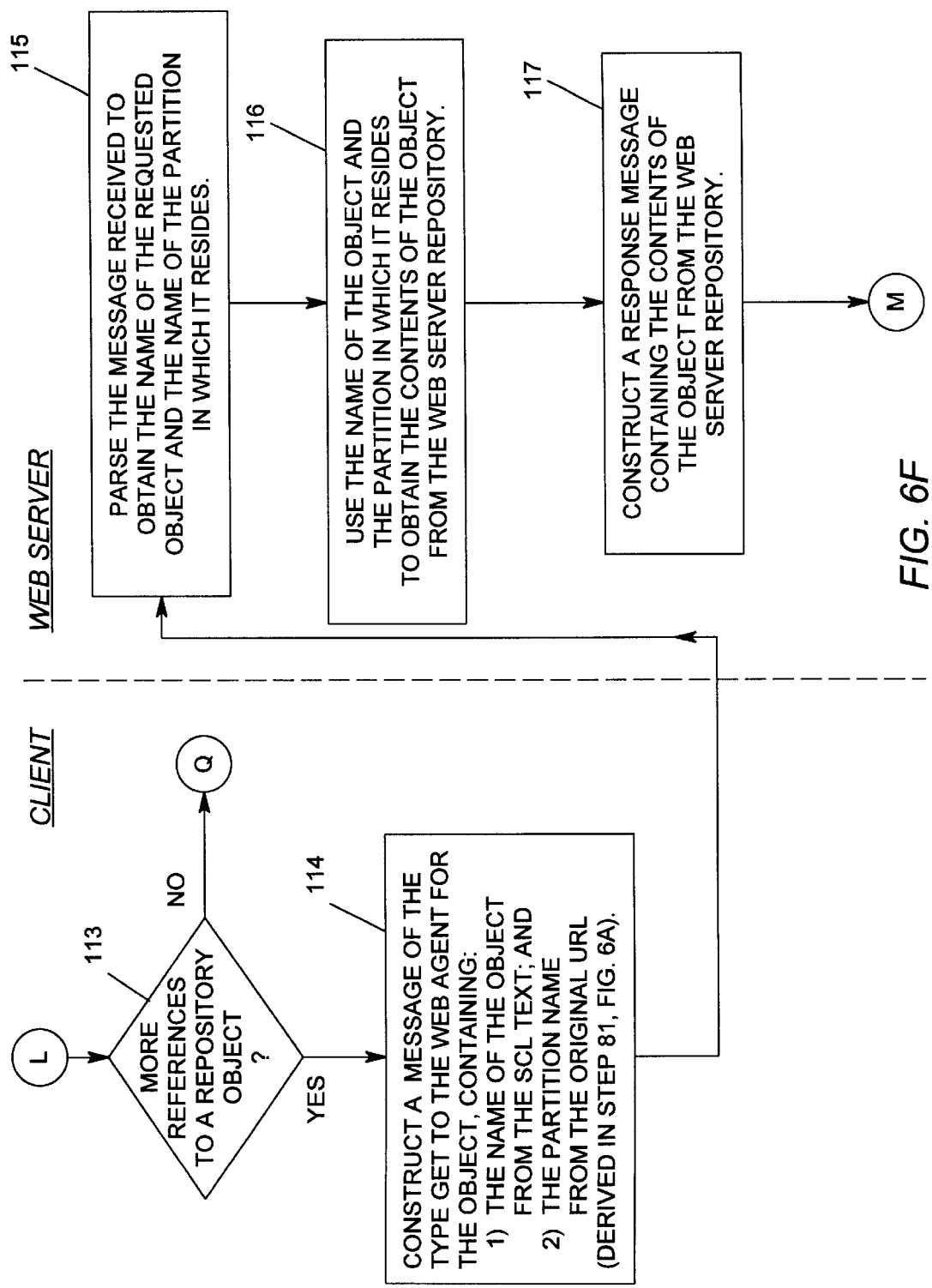

Referring now to FIG. 6F at the connector L, an inquiry is made as to whether or not there are more references to a Repository Object (diamond 113). If the answer to this inquiry is no, then a branch is made to a later-described part of the process as denoted by a connector Q. On the other hand, if the answer to the inquiry is yes, then the SCL Web Control constructs a message to the Web Agent for the object containing:

1.) The name of the object from the SCL Text; and,
2.) The Partition name from the original URL, which was derived in step 81, FIG. 6A.

Within the Web server 14, the Web Agent parses the message received to obtain the name of the requested object and the name of the Partition in which it resides (block 115). Next, the Web Agent uses the name of the object and the Partition in which it resides to obtain the contents of the object from the Web Server repository 18 (block 116). After this, the Web Agent constructs a response message containing the contents of the object from the Web Server repository 18 (block 117). The process illustration continues in the next sheet of the drawings as denoted by a connector M.

Figure 6G:
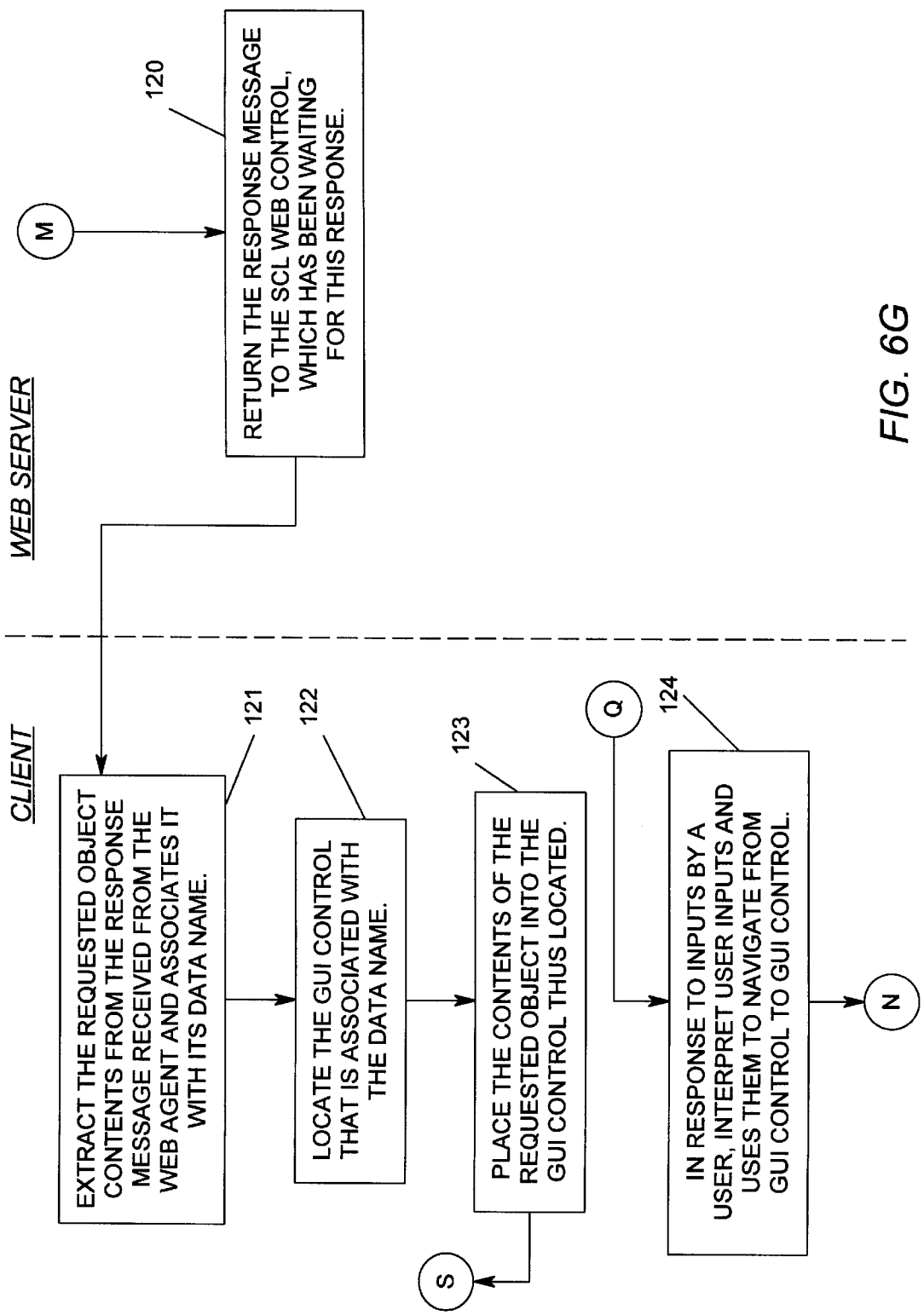

Referring now to FIG. 6G at the connector M, the Web Agent returns the response message to the SCL Web Control, which has been waiting for this response (block 120). Within the client 15, the SCL Web Control extracts the requested object contents from the response message received from the Web Agent and associates it with its Data Name (block 121). Next, the SCL Web Control locates the GUI Control that is associated with the Data Name (block 122). The SCL Web Control then places the contents of the requested object into the GUI Control thus located (block 123). At this juncture of the process a return is made back to the diamond 113 in FIG. 6F, as denoted by a connector L, to process the next reference to a Repository Object.

The connector Q from the no leg of the diamond 113 (FIG. 6F) intercepts the process at this point. In response to inputs by a user of the client 15, the Web control interprets user inputs and uses them to navigate from one GUI Control to another (block 124). The process illustration continues on the next sheet of the drawings as denoted by a connector N.

Figure 6H:
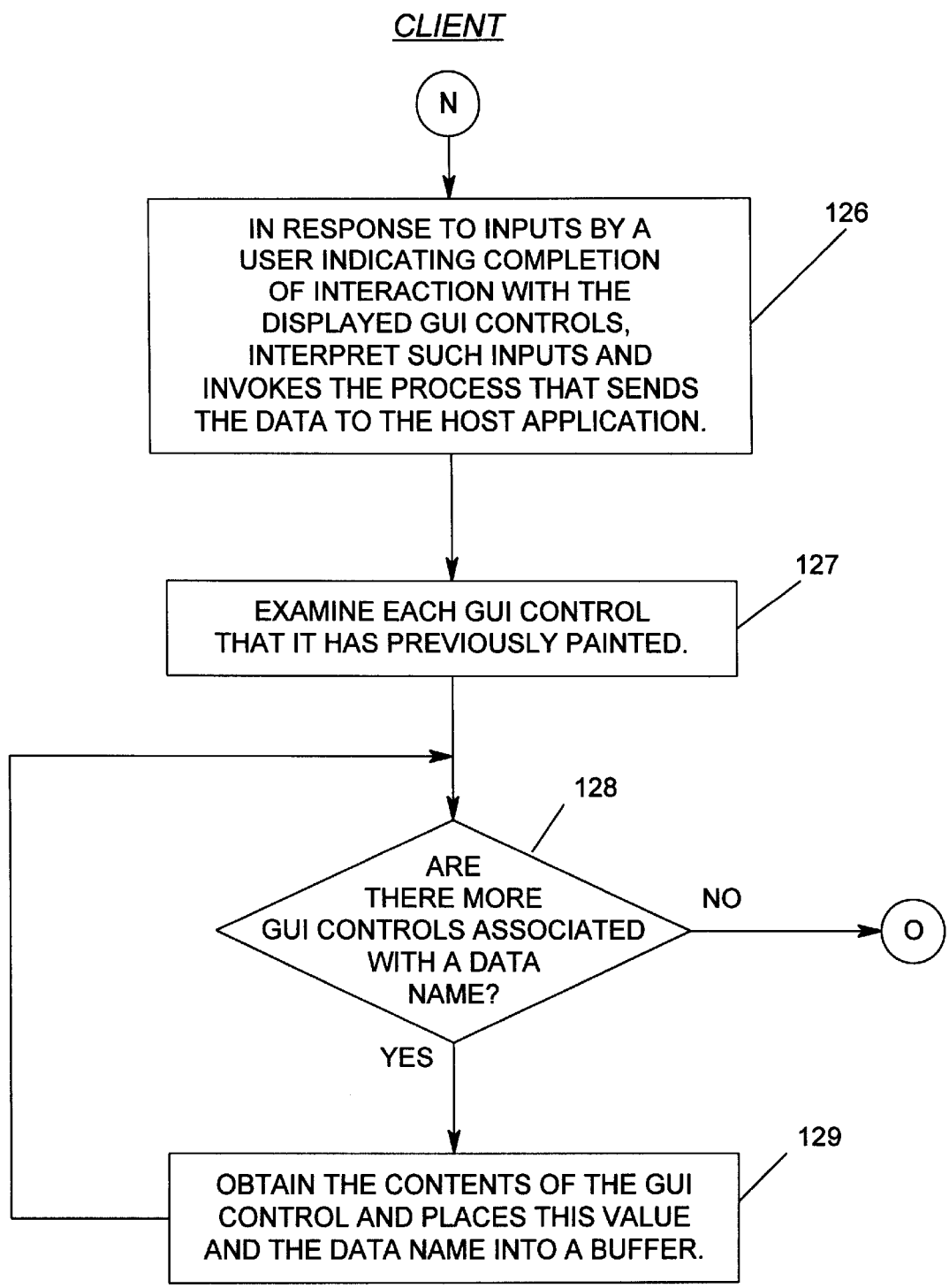

Referring now to FIG. 6H at the connector N, in response to inputs by a user of the client 15 indicating completion of interaction with the displayed GUI Controls, the Web control interprets such inputs and invokes the process that sends the data to the host application (block 126). This process begins at a process step where the SCL Web Control examines each GUI Control that it has previously painted (block 127). Following this, an inquiry is made as to whether or not there are more GUI Controls associated with a Data Name (diamond 128). If the answer to this inquiry is no, then a branch is made to a later point in the process as denoted by a connector O. On the other hand, if the answer to this inquiry is yes, then the SCL Web Control obtains the contents of the GUI Control and places this value and the Data Name into a buffer (block 129). Upon completion of this step a return is made back to the diamond 128 to inquire again if there are more GUI Controls associated with a Data Name. When all GUI Controls have been completed, an exit is taken to the next sheet of the drawings as denoted by the connector O.

Figure 6J:
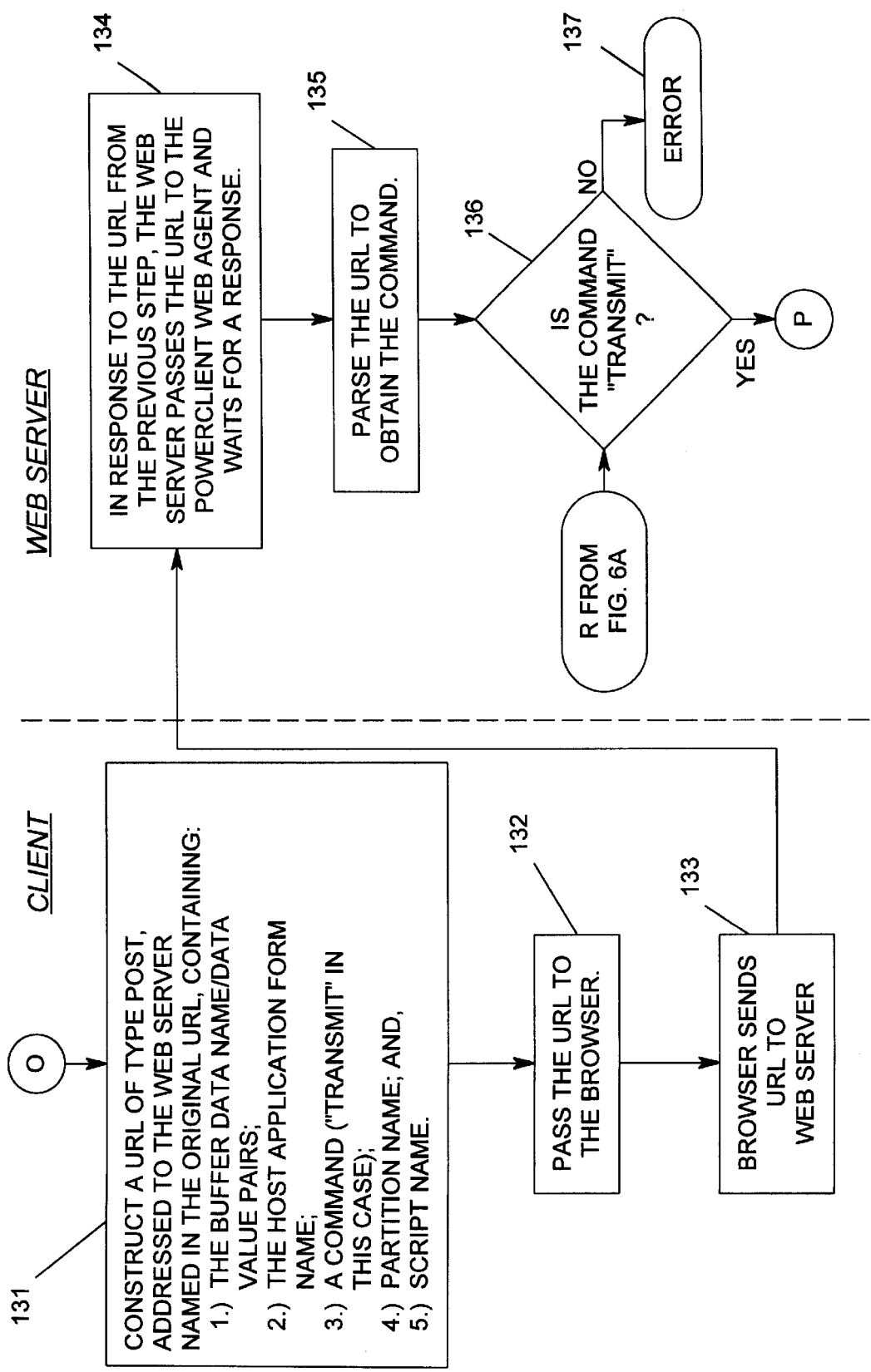

Referring now to FIG. 6J at the connector O, and still within the client 15, the SCL Web Control constructs a URL of type POST, addressed to the web server named in the original URL (derived at step 81, FIG. 6A), containing:

1.) The buffer Data Name/Data Value pairs;
2.) The host application Form name;
3.) A Command ("Transmit" in this case);
4.) Partition name; and,
5.) Script name (block 131).

The SCL Web Control then passes the URL to the Web browser (block 132). Next, the Web browser sends the URL to the Web server 14 (block 133). Within the Web server and in response to the URL from the previous step, the web server passes the URL to the PowerClient Web Agent (to which it is addressed) and waits for a response (block 134). Next, the Web Agent parses the URL to obtain the Command (block 135). After this, an inquiry is made as to whether or not the Command is "Transmit" (diamond 136). If the answer to this inquiry is no then an error message is issued (bubble 137). Note that the connector R, which is from the diamond 84 (FIG. 6A) and an indication that the Command is not "Open", is another input to the diamond 136. The error message is issued since the Command is neither an "Open" nor a "Transmit", which are the only two choices. On the other hand if the answer to this inquiry is yes, then the process continues on to the next sheet of the drawings as depicted by a connector P.

Referring now to FIG. 6K at the connector P, on determining that the Command is "Transmit", the Web Agent further parses the URL to obtain:

1.) The Data Name/Data Value buffer;
2.) The name of the Form with which this data is associated;
3.) Partition name; and,
4.) Script name (block 140).

The Web Agent then uses the name of the host application Form thus obtained to access the HRD or WDF object for the Form from the Web Agent repository 18 (block 141). Next, using the HRD or WDF files as a guide, the Web Agent extracts the fields from the Data Name/Data Value buffers and constructs a buffer for transmittal to the host application in the host 10 (block 142). After this, the Web Agent sends the host data buffer to the host application using the Script name obtained in step 140. Since the Command is "Transmit" the connection will have been established by a previous "Open" Command (block 143). It waits for a response from the host 10, which response includes the name of the next host application Form. Finally, the Web Agent retrieves the SCL Text and the HRD or WDF file developed for the next host application Form from the repository 18. After completion of this step the process repeats itself by returning to the process step 93 (FIG. 6C) as denoted by the connector H.

Figure 7:
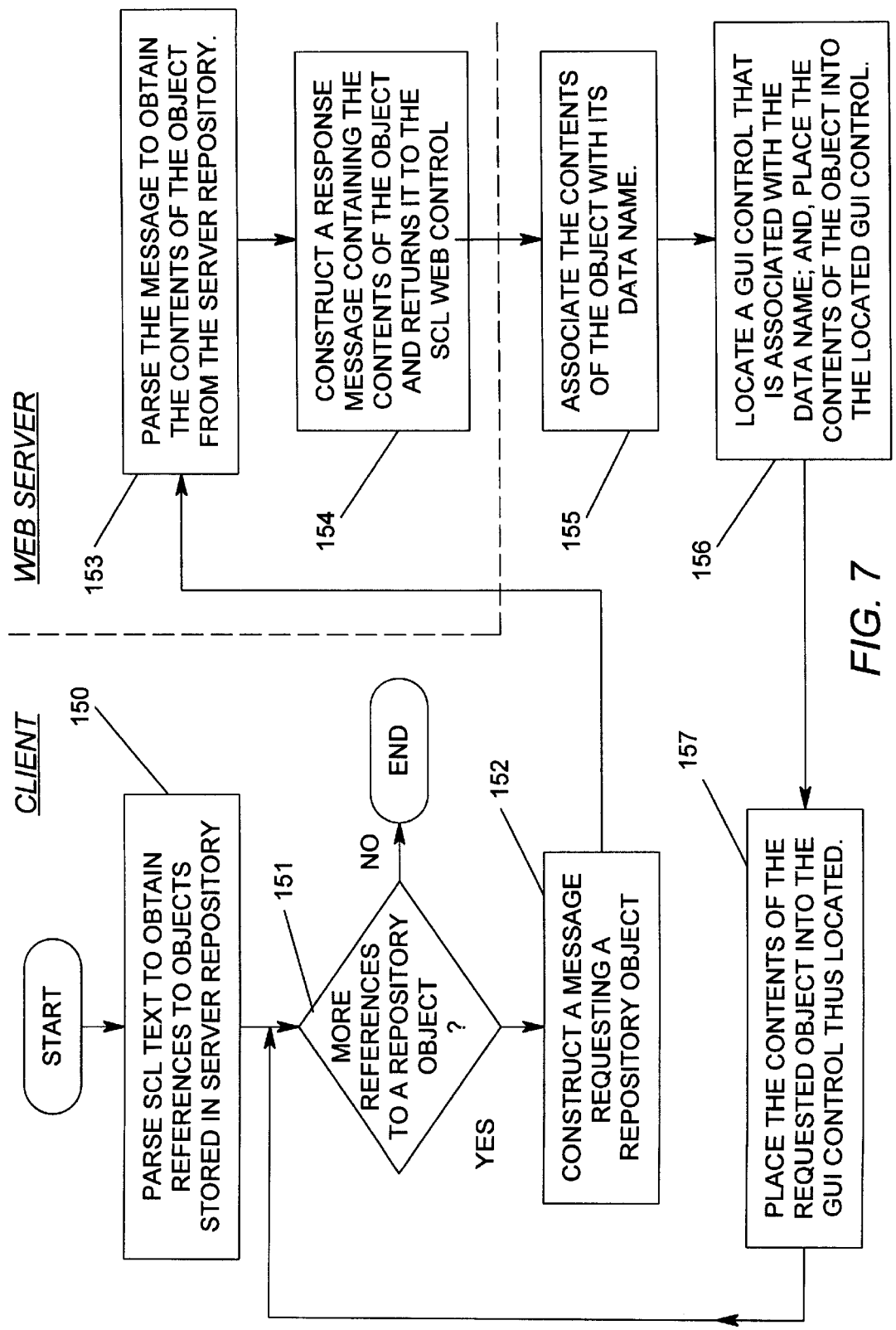
FIG. 7 is a flow chart illustrating the process of the present invention.

The method of the present invention is summarized in FIG. 7 and is useful in a computing system having at least one server and a multiplicity of clients coupled thereto by means of a network. The server includes a CPU executing a Web Server program and having a repository coupled thereto all as illustrated in FIG. 1. At least one of the clients executes a Web browser program. The method of the present invention operates in the server and at least one of the clients for supporting dynamic access to objects stored in the server repository by the Web browser program. More specifically, the method begins in the client by parsing an SCL Text parameter to obtain references to objects stored in the server repository (block 150). For each reference to an object stored in the server repository, a message is constructed for the Repository Object for transmission to the Web server (diamond 151, block 152). Within the Web server the message is used to retrieve the contents of the Repository Object from the server repository (block 153). Next, the retrieved contents of the Repository Object is returned to the client (block 154). Within the client, the contents of the Repository Object is associated with its Data Name (block 155). Next, a GUI Control is located that is associated with the Data Name (block 156); and, the contents of the Repository Object are placed into the GUI Control located in the previous step (block 157). Accordingly, a Form is displayed with GUI Controls filled in with values from the server repository.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computing system having at least one server and a multiplicity of clients coupled thereto by means of a network, said server having a CPU executing at Web Server program and having a repository coupled thereto for storing description language of a Form to be displayed, at least one of said clients executing a Web browser program, a method operating in said server and said at least one of said clients (hereafter said client) for supporting dynamic access to objects stored in said server repository by said Web browser program, said method comprising the steps of:

a. within said client, parsing said description language to obtain references to objects stored in said server repository;

b. for each reference to an object stored in said server repository:
      i.) within said client, constructing a message for said Repository Object for transmission to said server;
      ii.) within said server, using said message to retrieve contents of said Repository Object from said server repository;
      iii.) within said server, returning the retrieved contents of said Repository Object to said client;
      iv.) within said client, associating the contents of said Repository Object with its Data Name;
      v.) within said client, locating a GUI Control that is associated with said Data Name; and,
      vi.) within said client, placing contents of said Repository Object into said GUI Control located in the previous step, whereby said Form is displayed with GUI Controls filled in with values from said server repository.

2. The method as in claim 1 wherein the step b.i.) further includes constructing a message for transmission to said server that contains name of an object from said description language, and partition name received as parameters from a Web browser.

3. The method as in claim 1 wherein the step b.ii.) further includes parsing said message to obtain name of said object and name of partition in which it resides.

4. The method as in claim 1 wherein the step b.iii.)further includes constructing a response message containing contents of said object.

5. The method as in claim 1 wherein the step b.iv) further includes extracting said object from said response message.

6. The method as in claim 1 wherein said description language is Screen Control Language.

7. An object-oriented apparatus stored in the memory of a computer system for dynamically embedding objects stored in a Web server repository that stores a description language of a Form to be displayed by a Web browser, said apparatus comprising:

a. a first program for parsing a parameter of said description language to obtain references to objects stored in said Web server repository;

b. a second program for retrieving contents of said objects and returning to said first program; and, c. said first program associating contents of said objects retrieved with their Data Names, locating a GUI Control associated with each of said Data Names and placing contents of each of said objects into said located associated GUI Control, where by a Form is displayed with GUI Controls filled in with values from said repository.

8. The apparatus as in claim 7 wherein said description language is SCL.

9. The apparatus as in claim 7 wherein said first program is an SCL Web Control program.

10. The apparatus as in claim 7 wherein said second program is a Web Agent program.

11. The apparatus as in claim 7 wherein said first program finds references in said description language to object references, constructs a message for transmission to said second program that parses the received message, retrieves contents of said object from said repository and constructs and transmits a message containing said contents back to said first program.

12. The apparatus as in claim 11 wherein said first program receives and parses said message and finds GUI Controls and places said contents in said GUI Control.

13. In a computing system having at least one server and a multiplicity of clients coupled thereto by means of a network, said server having a CPU executing a Web Server program and having a repository coupled thereto, at least one of said clients executing a Web browser program, a method operating in said server and said at least one of said clients (hereafter said client) for supporting dynamic access to objects stored in said server repository by said Web browser program, said method comprising the steps of:

a. within said client parsing an SCL Text parameter to obtain references to objects stored in said server repository;

b. for each reference to an object stored in said server repository:

i.) within said client constructing a message for said Repository Object for transmission to said server;

ii.) within said server using said message to retrieve contents of said Repository Object from said server repository;

iii.) within said server returning the retrieved contents of said Repository Object to said client;

iv.) within said client associating the contents of said Repository Object with its Data Name;

v.) within said client locating a GUI Control that is associated with said Data Name; and, vi.) within said client placing contents of said Repository Object into said GUI Control located in the previous step, whereby a Form is displayed with GUI Controls filled in with values from said server repository.

14. The method as in claim 13 wherein the step b.i.) further includes constructing a message to said Web Agent program containing name of object from SCL Text, and partition name received by said Web SCL Control as parameters from a Web browser.

15. The method as in claim 13 wherein the step b.ii.) further includes parsing said message to obtain name of requested object and name of partition in which it resides.

16. The method as in claim 13 wherein the step b.iii.) further includes constructing a response message containing contents of said Repository Object.

17. The method as in claim 13 wherein the step b.iv.) further includes extracting requested object from said response message.

* * * * *